United States Patent [19]

Lundberg et al.

[11] 4,208,310

[45] Jun. 17, 1980

[54] ELASTOMERIC BLEND COMPOSITIONS OF A SULFONATED ELASTOMER POLYMER

[75] Inventors: Robert D. Lundberg; Jan Bock, both of Bridgewater; Henry S. Makowski, Scotch Plains, all of N.J.

[73] Assignee: Exxon Research & Engineering Co., Florham Park, N.J.

[21] Appl. No.: 19,704

[22] Filed: Mar. 12, 1979

Related U.S. Application Data

[63] Continuation-in-part of Ser. No. 855,766, Nov. 29, 1977, abandoned.

[51] Int. Cl.$^2$ .............................................. C08L 91/00
[52] U.S. Cl. .......................... 260/23.5 A; 260/23.7 R; 260/28.5 B; 260/33.6 AQ; 260/42.33; 260/42.47; 260/DIG. 31

[58] Field of Search ............ 260/23.7, 23.5 A, 28.5 B, 260/42.33, 42.47, DIG. 31

[56] References Cited

U.S. PATENT DOCUMENTS

| 3,642,728 | 2/1972 | Canter ............................ 260/23.7 M |
| 3,847,854 | 11/1974 | Canter et al. .................... 260/33.2 R |
| 3,974,240 | 8/1976 | Bock et al. ....................... 260/23.5 A |
| 3,974,241 | 8/1976 | Lundberg et al. .............. 260/23.5 A |

*Primary Examiner*—Lewis T. Jacobs
*Attorney, Agent, or Firm*—Richard E. Nanfeldt

[57] ABSTRACT

This invention relates to elastomeric blend compositions of a neutralized sulfonated elastomeric polymer. The compositions include a major portion of a sulfonated elastomeric polymer and a minor proportion of a non-polar wax, wherein the resultant composition has both improved physical and rheological properties.

35 Claims, No Drawings

ELASTOMERIC BLEND COMPOSITIONS OF A SULFONATED ELASTOMER POLYMER

CROSS-REFERENCE TO RELATED APPLICATIONS

This application is a CIP application of Ser. No. 855,766, filed Nov. 29, 1977 now abandoned.

FIELD OF THE INVENTION

This invention relates to elastomeric blend compositions of neutralized sulfonated elastomeric polymers. The compositions include a major portion of a sulfonated elastomeric polymer and a minor proportion of a non-polar wax, wherein the resultant composition has both improved physical and rheological properties.

BACKGROUND OF THE INVENTION

Recently, a new class of thermoelastic sulfonated polymers has been described in a number of U.S. patents. These sulfonated polymers are derived from polymeric materials having olefinic unsaturation, especially elastomeric polymers such as Butyl and EPDM rubbers. U.S. Pat. No. 3,642,728, herein incorporated by reference, clearly teaches a method of selective sulfonation of olefinic unsaturation sites of an elastomeric polymer to form an acid form of a sulfonated elastomeric polymer. The olefinic sites of the elastomeric polymer are sulfonated by means of a complex of a sulfur trioxide donor and a Lewis base. The sulfonated elastomer can be readily neutralized with a basic material to form an ionically cross-linked elastomer having substantially improved physical properties over an unsulfonated elastomer at room temperature. However, these ionically cross-linked elastomers, may be processed like conventional thermoplastics at elevated temperatures under a shear force in the presence of selected preferential plasticizers which dissipate the ionic associations at the elevated temperatures thereby creating a reprocessable elastomer.

The basic materials used as neutralizing agents are selected from organic amine or basic materials selected from Groups I, II, III, IV, V, VI-B, VIIB and VIII and mixtures thereof of the Periodic Table of Elements. Although these sulfonated elastomeric polymers prepared by the process of this patent are readily usable in a certain number of limited applications, they are not as readily adaptable for the manufacture of an extrudable and injection moldable elastomeric article as are the improved compositions of the present invention, wherein both improved physical and rheological properties are realized.

U.S. Pat. No. 3,836,511, herein incorporated by reference, teaches an improved process for the sulfonation of the olefinic sites of the elastomeric polymer, wherein the improved sulfonating agent is selected from acetyl sulfate, propionyl sulfate and butyryl sulfate. The neutralizing agents employed to neutralize the acid form of the sulfonated elastomeric polymers are organic amines. The resultant ionically cross-linked sulfonated elastomers prepared by this process do not exhibit both the improved physical and rheological properties of the compositions of the present invention.

U.S. Pat. No. 3,870,841, herein incorporated by reference, teaches a method of plasticization of the polymeric backbone of a neutralized sulfonated plastic polymer by means of a polymer chain plasticizer which is a liquid compound having a boiling point of at least about 120° F. The polymer chain plasticizer is selected from a dialkyl phthalate, a process oil or an organic acid ester. Additionally, a domain plasticizer can be incorporated into the composition, wherein the domain plasticizer reversibly disrupts the association of the sulfonated groups at a temperature of forming. The compositions formed by this process are not as suitable for the manufacture of high performance elastomeric articles formed by extrusion or injection molding process as are the compositions of the present invention.

U.S. Pat. No. 3,847,854, herein incorporated by reference, teaches a method of improving the processability of neutralized sulfonated elastomeric polymers by the addition of a preferential plasticizer which has at least one functional constituent which exhibits a bond moment whose absolute value is at least 0.6 Debyes, and must be a liquid at the desired processing temperature of the neutralized sulfonated elastomeric polymer. Again, the compositions of the present invention are more adaptable for use in the manufacture of high performance elastomeric articles.

Products resulting from the aforementioned methods for obtaining neutralized sulfonated elastomeric compositions possess either unsuitable rheological or physical properties for the applications envisioned in the present invention.

For example, the resultant sulfonated elastomeric compounds designed for extruded applications, namely, for the manufacture of garden hose, display excellent physical properties in many respects such as resilience, low and high temperature flexibility, flex fatigue, etc. However, those compounds displaying these highly desired characteristics also can display high melt viscosity and melt elasticity which makes smooth extrusion at desirably high production rates very difficult, if not impossible. Consequently, such systems are difficult to process in the equipment which is required to make the shape for which these compounds were originally designed.

It would be extremely desirable to develop such compounds which display the desirable balance of physical properties and processability needed for such extrusion applications. The same comments also apply to injection molding compounds. In addition it is highly desired and indeed essential that this balance be achieved at relatively low compound costs in order that these systems can compete economically for such cost conscious applications.

U.S. Pat. No. 3,974,240 and 3,974,241 issued on Aug. 10, 1976 describe the blending of a crystalline polyolefinic material with a neutralized sulfonated elastomeric polymer in an attempt to improve both the rheological and physical properties of the elastomeric polymer. The selection of the use of the crystalline polyolefinic material to improve both the stiffness as well as improving the melt viscosity of the composition was based in part upon the limitation of the use of fillers such as carbon black, clays, calcium carbonate or silicates as a single additive to the elastomeric polymer. Although fillers in combination with an elastomeric polymer increase the hardness of the composition, these fillers deteriorate the melt viscosity of the resultant composition.

The unique and novel compositions of the present invention overcome the deficiencies of the aforementioned U.S. patents and applications from both a rheological and physical properties aspect. The blend compositions of the present invention contribute to solution of having a material which has both desirable rheological and physical properties.

For example, the incorporation of a crystalline polyolefin, such as polyethylene, at even a modest level of 10 wt. % can markedly increase the hardness of an elastomeric composition which can be undesirable for many applications. Similarly, the use of a polar plasticizer to preferentially plasticize the ionic domains provides a blend composition with markedly improved flow behavior but at a substantial sacrifice in physical properties, especially at elevated temperatures.

The present invention teaches a blend composition formed from a sulfonated elastomeric polymer and a non-polar wax, wherein the wax improves the flow properties of the composition without substantially adversely affecting the physical properties.

SUMMARY OF THE INVENTION

It has been found surprisingly that blend compositions formed from a major portion of a neutralized sulfonated elastomeric polymer and a non-polar wax has improved physical and rheological properties as compared to the unmodified neutralized sulfonated elastomeric polymer.

Accordingly, a non-reactive chemical additive is provided for the formation of elastomeric blend compositions of a sulfonated elastomeric polymer, wherein the resultant elastomeric blend has improved physical and rheological properties.

Additionally, a means is provided for improving the dispersion of a filler into a neutralized sulfonated elastomeric polymer through the utilization of a non-reactive chemical additive.

GENERAL DESCRIPTION OF THE INVENTION

The present invention relates to improved blend compositions of a chemical additive and a neutralized sulfonated elastomeric polymer, wherein the resultant composition has improved physical and rheological properties as compared to an unmodified sulfonated elastomeric polymer. In particular, the chemical additives encompassed by this present invention are non-polar waxes.

The neutralized sulfonated elastomeric polymers of this present instant invention are derived from unsaturated polymers which include low unsaturated elastomeric polymers such as Butyl rubber, or EPDM terpolymers. Alternatively, other unsaturated polymers are selected from the group consisting of partially hydrogenated polyisoprenes, partially hydrogenated polybutadienes, Neoprene, styrene-butadiene copolymers and isoprene-styrene random copolymers.

The expression "Butyl rubber" as employed in the specification and claims is intended to include copolymers made from a polymerization reaction mixture having therein from 70 to 99.5% by weight of an isoolefin which has about 4 to 7 carbon atoms, e.g. isobutylene and about 0.5 to 30% by weight of a conjugated multiolefin having from about 4 to 14 carbon atoms, e.g. isoprene. The resulting copolymer contains 85 to 99.8% by weight of combined isoolefin and 0.2 to 15% of combined multiolefin. Butyl rubber generally has a Staudinger molecular weight of about 20,000 to about 500,000, preferably about 25,000 to about 400,000, especially about 100,000 to about 400,000, and a Wijs Iodine No. of about 0.5 to 50, preferably 1 to 15. The preparation of Butyl rubber is described in U.S. Pat. No. 2,356,128 which is incorporated herein by reference.

For the purpose of this invention, the Butyl rubber may have incorporated therein from about 0.2 to 10% of combined multiolefin; preferably about 0.5 to about 6%, more preferably, about 1 to about 4%, e.g. 2%. Illustrative of such a Butyl rubber is Exxon Butyl 365 (Exxon Chemical Co.), having a mole percent unsaturation of about 2.0% and a Mooney viscosity (ML, 1+8, 212° F.) of about 40-50. Low molecular weight Butyl rubbers, i.e. Butyl rubbers having a viscosity average molecular weight of about 5,000 to 85,000 and a mole percent unsaturation of about 1 to about 5% may be sulfonated to produce the polymers useful in this invention. Preferably, these polymers have a viscosity average molecular weight of about 25,000 to about 60,000.

The EPDM terpolymers are low unsaturated polymers having about 1 to about 10.0 wt. % olefinic unsaturation, more preferably about 2 to about 8, most preferably about 3 to 7 defined according to the definition as found in ASTM-D-1418-64 and is intended to mean terpolymers containing ethylene and propylene in the backbone and a diene in the side chain. Illustrative methods for producing these terpolymers are found in U.S. Pat. No. 3,280,082, and French Pat. No. 1,386,600, which are incorporated herein by reference. The preferred polymers contain about 40 to about 75 wt. % ethylene and about 1 to about 10 wt. % of a diene monomer, the balance of the polymer being propylene. Preferably, the polymer contains about 45 to about 70 wt. % ethylene, e.g. 50 wt. % and about 2.6 to about 8.0 wt. % diene monomer, e.g. 5.0 wt. %. The diene monomer is preferably a non-conjugated diene. Illustrative of these non-conjugated diene monomers which may be used in the terpolymer (EPDM) are 1,4-hexadiene, dicyclopentadiene, 5-ethylidene-2-norbornene, 5-methylene-2-norbornene, 5-propenyl-2-norbornene, and methyl tetrahydroindene. A typical EPDM is Vistalon 2504 (Exxon Chemical Co.), a terpolymer having a Mooney viscosity (ML, 1+8, 212° F.) of about 40 and having an ethylene content of about 50 wt. % and a 5-ethylidene-2-norbornene content of about 5.0 wt. %. The $\overline{M}n$ as measured by GPC of Vistalon 2504 is about 47,000, the $\overline{M}v$ as measured by GPC is about 145,000 and the $\overline{M}w$ as measured by GPC is about 174,000. Another EPDM terpolymer Vistalon 2504-20 is derived from Vistalon 2504 by a controlled extrusion process, wherein the resultant Mooney viscosity (ML, 1+8, 212° F.) is about 20. The $\overline{M}n$ as measured by GPC of Vistalon 2504-20 is about 26,000, the $\overline{M}v$ as measured by GPC is about 90,000 and the $\overline{M}w$ as measured by GPC is about 125,000.

Nordel 1320 (DuPont) is another terpolymer having a Mooney viscosity (ML, 1+8, 212° F.) of about 25 and having about 53 wt. % of ethylene, about 3.5 wt. % of 1,4-hexadiene, and about 43.5 wt. % of propylene.

The EPDM terpolymers of this invention have a number average molecular weight ($\overline{M}n$) as measured by GPC of about 10,000 to about 200,000, more preferably of about 15,000 to about 100,000, most preferably of about 20,000 to about 60,000. The Mooney viscosity (ML, 1+8, 212° F.) of the EPDM terpolymer is about 5 to about 60, more preferably about 10 to about 50, most preferably about 15 to about 40. The $\overline{M}v$ as measured by GPC of the EPDM terpolymer is preferably below about 350,000 and more preferably below about 300,000. The $\overline{M}w$ as measured by GPC of the EPDM terpolymer is preferably below about 500,000 and more preferably below about 350,000.

The preparation of these neutralized sulfonated elastomers has been described in a series of copending applications filed at the same time as the instant invention. The exact method employed to prepare the neutralized sulfonated EPDM (or Butyl) is not of critical importance provided the resulting product is substantially free of covalent cross-linking (or gel free) has the requisite sulfonate content, and exhibits the rheological characteristics described in this application. The degree of sulfonation of the elastomeric polymers of the instant invention is about 10 to about 100 meq. of sulfonate groups per 100 grams of sulfonated elastomeric polymer, more preferably 15 to 50 meq., and most preferably 20 to 40 meq.

The melt viscosity of the polymeric systems investigated were determined by the use of an Instron Capillary Rheometer. Generally, the melt viscosity measurements were made at a temperature of 200° C. and at various shear rates corresponding to crosshead speeds from 0.005 in/min to 20 in/min. The apparent viscosity of 200° C. and at a shear rate of 0.73 sec$^{-1}$ (0.005 in/min) is employed as a characterization parameter in this invention. A measure of the melt elasticity of a given system can also be obtained from these rheological measurements. A type of flow instability known as melt fraction is exhibited by many polymeric materials of high molecular weight. This phenomenon is shear sensitive and thus will generally exhibit itself at a given shear rate and temperature. The shear rate for the onset of melt fracture indicates the upper shear rate for processing a given material. This is used as a characterization parameter for compounds employed in extrusion processing.

The metal sulfonate containing polymers at the higher sulfonate levels possess extremely high melt viscosities and are thereby difficult to process. The addition of ionic group plasticizers markedly reduces melt viscosity and frequently enhances physical properties.

To the neutralized sulfonated elastomeric polymer can be added, in either solution or to the crumb of the acid form of the sulfonated elastomeric polymer, a preferential plasticizer selected from the group consisting of carboxylic acids having about 5 to about 30 carbon atoms, more preferably about 8 to abut 22 carbon atoms, and basic salts of these carboxylic acids wherein the counterion of the basic salt is selected from the group consisting of aluminum, ammonium, lead and metals of Groups IA, IIA, IB or IIB of the Periodic Table of Elements and mixtures thereof. The carboxylic acids are selected from the group consisting of lauric, myristic, palmitic and stearic acids and mixtures thereof; e.g. zinc stearate, magnesium stearate or zinc laurate.

The preferential plasticizer is incorporated into the neutralized sulfonated elastomeric polymer at about 1 to about 60 parts by weight based on 100 parts by weight of the sulfonated polymer, more preferably at about 7 to about 40, and most preferably at about 9 to about 25. The metallic salt of the carboxylic acid can also be used as neutralizing agent. In the case of the neutralizing agent and plasticizer being the identical chemical species, additionally basic salt is added over the required levels of neutralization. Alternatively, other preferential plasticizers are selected from amines, amides such as stearamide, ammonium and amine salts of carboxylic acids and mixtures thereof. The preferred plasticizers are selected from carboxylic acid or metallic salts of carboxylic acid and mixtures thereof. The resultant neutralized sulfonated elastomeric polymer with preferential plasticizer is isolated from the solution by conventional steam stripping and filtration.

The resultant neutralized and plasticized sulfonated elastomer has a viscosity at 200° C. and a shear rate at 0.73 sec$^{-1}$ of about $1\times10^4$ poise to about $5\times10^6$ poise, more preferably of about $5\times10^4$ poise to about $2\times10^6$ poise and most preferably of about $1\times10^5$ poise to about $1\times10^6$ poise. The resultant neutralized sulfonated EPDM terpolymer with preferential plasticizer is isolated from the solution by conventional steam stripping or coagulation followed by filtration.

The neutralized sulfonated EPDM terpolymer is blended with a non-polar wax or a combination of a filler and a non-polar wax by techniques well known in the art. For example, the blend composition can be compounded on a two roll mill. Other methods known in the art which are suitable for making these compositions include those methods employed in the plastic and elastomer industries for mixing polymer systems. An excellent polymer blend composition of this invention can be obtained through the use of a high shear batch intensive mixer called the Banbury. Alternatively, economic advantages in terms of time and labor savings can be obtained through the use of a Farrel Continuous Mixer, a twin screw extruder, or extrusion techniques which are continuous mixing type equipment. The Banbury mixing device is the preferred batch type mixer, and the twin screw extruder is the preferred continuous mixer.

The fillers employed in the present invention are selected from the group consisting of talcs, ground calcium carbonate, water precipitated calcium carbonate, and delaminated, calcined and hydrated clays and mixtures thereof. These fillers are incorporated into the blend composition at about 25 to about 350 parts by weight per 100 parts by weight of the neutralized sulfonated elastomeric polymer, more preferably at about 50 to about 350; and most preferably at about 50 to about 300. Typically, these fillers have a particle size of about 0.03 to about 20 microns, more preferably about 0.3 to about 10, and most preferably about 0.5 to about 10. The oil absorption as measured by grams of oil absorbed by 100 grams of filler is about 10 to about 100, more preferably about 10 to about 85, and most preferably about 10 to about 75. Typical fillers employed in this invention are illustrated in Table I.

TABLE I

| Filler | Code # | Oil Absorption grams of oil/100 grams of filler | Specific Gravity | Avg. Particle Size Micron | pH |
|---|---|---|---|---|---|
| Calcium carbonate ground | Atomite | 15 | 2.71 | | 9.3 |
| Calcium carbonate precipitated | Purecal U | 35 | 2.65 | .03–.04 | 9.3 |
| Delaminated clay | Polyfil DL | 30 | 2.61 | 4.5 | 6.5–7.5 |
| Hydrated clay | Suprex | | 2.6 | 2 | 4.0 |
| Calcined clay | Icecap K | 50–55 | 2.63 | 1 | 5.0–6.0 |
| Magnesium silicate | Mistron | 60–70 | 2.75 | 2 | 9.0–7.5 |

TABLE I-continued

| Filler | Code # | Oil Absorption grams of oil/100 grams of filler | Specific Gravity | Avg. Particle Size Micron | pH |
|---|---|---|---|---|---|
| (talc) | Vapor | | | | |

Waxes are derived from various sources: petroleum waxes covering paraffin and microcrystalline wax; synthetic waxes including polyethylene and Fischer-Tropsch wax; natural waxes from plants, insects and animals. The petroleum and synthetic waxes are most important for the present invention.

Other than paraffinic, naphthenic and aromatic hydrocarbon groups waxes can contain polar functional groups such as alcohols, ketones, and esters. It is preferred that the waxes used in this invention be predominantly non-polar since polar functional groups frunction as plasticizers for the ionic sulfonate groups. Excessive plasticization is undesirable. The largest percentage of polar functional groups in waxes are those containing oxygen by virtue of hydrocarbon oxidation. For the purpose of this invention, a wax is considered to be non-polar when it contains less than 4.0 wt. %, more preferably less than 2.0 wt. % oxygen.

A description of paraffinic and microcrystalline waxes is given in the Kirk-Othmer "Encyclopedia of Polymer Science and Technology", 1971, Vol. 14, pp. 768–779 and is abstracted below.

Paraffin waxes consist primarily of straight-chain saturated hydrocarbons with only a small amount of branching such as 2-methyl groups, near the end of the chain. The amount of n-alkanes in paraffin wax usually exceeds 75% and may reach almost 100%. The molecular weights of the hydrocarbons in paraffin wax range from about 280 to 560 ($C_{20}$–$C_{40}$), with each specific wax having a range of about eight to fifteen carbon numbers.

The ranges of properties representative of several different paraffin waxes are presented in Table 2. Some of the commercial waxes included in the listed property range are also given. Paraffin waxes are generally lower melting, have lower molecular weights, and have lower viscosities when liquid than microcrystalline waxes. Paraffin waxes, in the solid state, exist in the form of large, distinct crystals, in contrast to the microscopic crystals of microcrystalline waxes. Physical properties of paraffin wax of an average molecular weight of 400 are listed in Table 3. Paraffin wax is soluble in non-polar organic solvents such as benzene, chloroform, carbon tetrachloride, and naphtha, and insoluble in polar solvents such as water and methanol.

TABLE 2

TYPICAL OF PARAFFIN WAX IN DIFFERENT MELTING POINT RANGES

| | $A^a$ | $B^b$ | $C^c$ | $D^d$ | $E^e$ |
|---|---|---|---|---|---|
| Melting point, °C. (ASTM-D-87) | 51–53 | 54–56 | 56–58 | 60–62 | 67–71 |
| Oil content, % (ASTM-D-721) | 0.1–0.4 | 0.1–0.3 | 0.1–0.2 | 0.1–0.2 | 0.2–0.5 |
| Hardness (penetration) at C. (77° F.) | 14–20 | 12–15 | 10–14 | 9–14 | 9–18 |
| Hardness (penetration) at 38° C. (100° F.) (ASTM-D-1321) | 80–200 | 50–100 | 40–60 | 20–40 | 13–38 |
| Saybolt viscosity at 99° C. (210° F.), SUS (ASTM-D-88) | 37–39 | 37–39 | 38–40 | 40–42 | 45–53 |
| Kinematic viscosity at 99° C. (210° F.), cSt (ASTM-D-445) | 3.2–3.8 | 3.2–3.8 | 3.6–3.9 | 4.1–4.9 | 5.7–8.2 |

[a]Includes Atlantic Wax 151, Essowax 2530, Gulfwax 27, Mobilwax 128/130, Shellwax 100, Sunoco Wax 3425.
[b]Includes Aristowax 130/134, Atlantic Wax 171, Boron wax 133/135, Essowax 3050, Shellwax 120, Sunoco wax 3422.
[c]Includes Boron wax 138/140, Eskar wax R-35, Essowax 3250, Mobilwax 138/140, Sinclair wax 133, Sunoco wax 3420.
[d]Includes Atlantic wax 1115, Essowax 4030, Gulfwax 40, Pacemaker wax 45, Sinclair wax 141, Shellwax 270.
[e]Includes Aristowax 165, Essowax 5250, Shellwax 3000, Sunoco wax 5512.

Microcrystalline waxes are the solid hydrocarbon mixtures refined from crude petrolatums, which are obtained from the dewaxing of residual lubricating oil stocks and tank-bottom wax. These waxes are known as microcrystalline because their relatively small crystals given an amorphous appearance to the waxes in the solid state.

Microcrystalline waxes vary considerably in composition and properties, in contrast to paraffin wax. Generally, microcrystalline waxes consist of branched-chain hydrocarbons and alkyl cycloaliphatic (naphthenic) hydrocarbons as well as some straight-chain molecules, depending on the particular wax. The molecular weights range from about 450 to 800 ($C_{35}$–$C_{60}$). Some physical properties are listed in Table 3.

TABLE 3

TYPICAL PHYSICAL PROPERTIES OF PETROLEUM WAXES

| | Paraffin Wax | Microcrystalline Wax |
|---|---|---|
| Density of solid at 20° C., g/ml | 0.88–0.93 | 0.89–0.94 |
| Density of liquid at 100° C., g/ml | 0.73–0.77 | 0.78–0.81 |
| Refractive index in solid state, 20° C. | 1.526–1.535 | |
| Refractive index, liquid, 100° C. | 1.418–1.433 | 1.435–1.445 |
| Specific heat of liquid, cal/g°C. | 0.50–0.53 | 0.50–0.55 |
| Latent heat of fusion, cal/g | 55–61 | 50–58 |

The waxes are incorporated into the blend composition at a concentration level of about 2 to about 20 parts by weight per 100 parts by weight of the neutralized sulfonated elastomeric polymer, more preferably about 2 to 15, and most preferably about 7 to about 15.

The waxes employed in the present invention have a softening point of about 125° F. to about 220° F., more preferably about 135° F. to about 200° F., and most preferably about 150° F. to about 200° F. The preferred waxes have an $\overline{M}n$ of about 300 to about 4,000. Some of the typical waxes are described in Table 2. These waxes are typically crystalline wherein the percent crystallinity can vary depending on the composition of the wax and the $\overline{M}_n$.

The incorporation of the waxes at the levels described in this invention imparts some beneficial and surprising characteristics to the sulfonated elastomeric compounds. Those benefits include a significant reduction of melt viscosity at elevated temperature for these compounds, with little sacrifice in physical properties at ambient temperatures, reduction in tack at room temperature, and a substantial improvement in the resistance of these sulfonated EPDM based compounds to moisture during prolonged immersion. This latter characteristic is of substantial importance because these ionic elastomers can pick up as much as 30 to 50 wt. % moisture after prolonged immersion at 50° C. In contrast, the incorporation of a suitable wax at a sufficient level will markedly reduce the level of water sensitivity. The magnitude of this improvement is believed to depend on the amount of wax incorporated.

In addition to these improvements, it is observed that the addition of modest levels of wax to sulfonated elastomer compounds improves the extrusion behavior at elevated temperatures by providing a more uniform flow than is obtained in the absence of wax. This improvement is detectable at a relatively low level of wax, from 2 to 15 wt. % based on compound.

The oils which can be employed in the compositions of the present invention are non-polar process oils having less than about 2 weight percent polar type compounds as measured by molecular type clay gel analysis. These oils are selected from paraffinics ASTM Type 104B as defined in ASTM-D-2226-70, aromatics ASTM Type 102 or naphthenics ASTM Type 104A, wherein the oil has a flash point by the Cleveland open cup of at least 350° F., a pour point of less than 40° F., a viscosity of about 70 to about 300 s.s.u.'s at 100° F. and a number average molecular weight of about 300 to about 1000, and more preferably about 300 to 750. The preferred process oils are paraffinics. Table II illustrates typical oils encompassed by the scope of this invention.

The oils are incorporated into the blend composition at a concentration level of less than about 1 to about 100 parts by weight per 100 parts by weight of the neutralized sulfonated elastomeric polymer, more preferably at less than about 40, and most preferably at less than about 25.

The ingredients incorporated into the blend compositions of the present invention, in conjunction with the type of elastomeric polymer, the degree of sulfonation, and the metal counterion of the neutralized sulfonated elastomeric polymer and the plasticizer give materials processable by extrusion or injection molding processes into elastomeric articles having the desirable physical and rheological properties. These combined physical properties and rheological processability characteristics were not previously obtainable in the aforementioned U.S. patents and applications previously incorporated herein by reference.

DETAILED DESCRIPTION

The advantages of both the rheological and physical properties of the blend compositions of the present invention can be more readily appreciated by reference to the following examples and tables. Unless otherwise specified, all measurements are in parts per hundred by weight.

EXAMPLE 1

One hundred grams of an EPDM terpolymer, Vistalon 2504-20, was dissolved under agitation in 1000 ml. of n-hexane at 40° C. The resultant cement was cooled to room temperature and 5.74 ml. of acetic anhydride (60.75 mmoles) was then added. While stirring the mixture, 2.1 ml. of 95% $H_2SO_4$ (37.5 mmoles) was added dropwise. The sulfonation reaction was quenched after 30 minutes with 150 ml. of isopropanol. The acid form of the sulfonated polymer was analyzed by Dietert Sulfur Analysis to have 33 meq. of $SO_3H$ groups per 100 grams of sulfonated polymer. To the quenched sulfonated cement was added with stirring for thirty minutes 25.6 grams (90 mmoles/100 grams of EPDM) of stearic acid. A solution of 9.87 grams (90 meq./100 g. of EPDM) of zinc acetate dihydrate dissolved in 25 ml. of distilled water was then added in the cement and the cement stirred for an additional 30 minutes. Antioxidant 2246 (0.5 grams) was then added to the cement. The resultant plasticized, neutralized sulfonated EPDM terpolymer was then isolated by steam stripping and drying on a rubber mill at 220° F., wherein the sulfonated terpolymer has an apparent viscosity at 0.73 $sec^{-1}$ at 200° C. of about $3.3 \times 10^5$ poise. This material was incapable of being injection molded on a low pressure Desma machine equipped with a standard canvas footwear type mold.

EXAMPLE 2

The sulfonated EPDM gum was prepared in an identical manner as described in Example 1. The polymer was blended with several different waxes by blending 10 parts of wax with 100 parts of Sulfo EPDM in a suitable Brabender mixing head at a temperature of about 175° C. until a smooth homogeneous dispersion was obtained, for a total of about 10–15 minutes. The resulting viscous melt was then sheeted out on a warm (~200° F.) two roll mill. The waxes employed are described in Table 4.

TABLE II

| Type Oil | Oil Code # | Viscosity s.s.u. | $M_n$ | % Polars | % Aromatic | % Saturates |
|---|---|---|---|---|---|---|
| Paraffinic | Sunpar 115 | 155 | 400 | 0.3 | 12.7 | 87.0 |
| Paraffinic | Sunpar 180 | 750 | 570 | 0.7 | 17.0 | 82.3 |
| Paraffinic | Sunpar 2280 | 2907 | 720 | 1.5 | 22.0 | 76.5 |
| Aromatic | Flexon 340 | 120 | — | 1.3 | 70.3 | 28.4 |
| Naphthenic | Flexon 765 | 505 | — | 0.9 | 20.8 | 78.3 |

TABLE 4

| WAXES EMPLOYED IN SULFO EPDM BLENDS | | | |
|---|---|---|---|
| Brand Name | AC-6-PE Wax | Paraffin Wax 3504 | Mikon 10 |
| Description | Polyethylene based wax | Refined Paraffin wax | Refined microcrystalline wax |

TABLE 4-continued

WAXES EMPLOYED IN SULFO EPDM BLENDS

| Brand Name | AC-6-PE Wax | Paraffin Wax 3504 | Mikon 10 |
|---|---|---|---|
| Approximate Mol. Wt. | about 2000 | ~500 | ~700 |
| Drop Melting Point, °F. | — | 152 | 197 |
| Density | 0.92 | 0.923 | 0.942 |
| Softening Point, °F. | 222° | — | — |

The melt index of the wax-Sulfo EPDM blends was measured at 190° C. at a pressure of 226 psi. The relative flow values were obtained through a weight measurement of the extrudate after the equivalent of 10 minutes.

TABLE 5

EFFECT OF WAX ON THE MELT INDEX OF SULFO EPDM GUM
(10 pts wax per 100 pts Sulfo EPDM)

| Composition | Melt Index at 190° C. gms/10 min, 226 psi |
|---|---|
| Sulfo EPDM Control | 1.515 |
| 100 pts Sulfo EPDM + 10 pts AC-6-PE Wax | 4.015 |
| 100 pts Sulfo EPDM + 10 pts. Mekon Wax #10 | 4.805 |
| 100 pts Sulfo EPDM + 10 pts F 3504 Paraffin Wax | 3.927 |

It is evident from the data in Table 5 that the incorporation of moderate wax levels substantially enhances the flow behavior of the Sulfo EPDM gum. This characteristic is very desirable because such sulfonated elastomers can possess undesirably high melt viscosities.

EXAMPLE 3

One of the undesirable characteristics of ionic elastomers in general, and sulfonated elastomer in particular, is that they can display a significant degree of water sensitivity. The incorporation of the types of waxes described in this application surprisingly reduces the degree of water sensitivity. The amount of wax incorporated in these blends will have an effect on the degree of improvement in water sensitivity observed. A series of wax-Sulfo EPDM blends was prepared as described in Example 2, except in these cases significantly higher levels of wax were incorporated in order to assess the effect more rapidly. The resultant blends were then compression molded at 300° F. to form pads about 0.020 inches thick. These pads were weighed and then immersed in water at 50° C. for a period of 21 days. After that time period the pads were removed, surface moisture blotted off, and then weighed. The increase in weight was determined in terms of weight percent increased over the original pad weight. The values are given in Table 6.

TABLE 6

EFFECT OF A WAX ON SULFO-EPDM WATER SENSITIVITY

| Composition | Melt Index 190° C. 226 psi | % Wt. Increase 21 days in 50° C. Water |
|---|---|---|
| Control Sulfo-EPDM, No additive | 1.62 | 37.02 |
| 44.5 gms Sulfo-EPDM + 19 gms Mekon #10 wax | >30 | 12.5 |
| 41.5 gms Sulfo-EPDM + 19 gms F3504 wax | 35.2 | 10.1 |
| 38 gms Sulfo-EPDM + 19 gms AC-6-PE wax | 27.5 | 11.6 |

It is clearly evident that the presence of the various waxes markedly reduce the degree of water sensitivity of the blends as contrasted to Sulfo-EPDM Control.

EXAMPLE 4

The sulfonated EPDM described in Example 1 was employed to make two compounds A and B having the following formulation:

| | A(Control) | B Wax Blend |
|---|---|---|
| Sulfo EPDM | 100 pts | 100 pts |
| Sunpar 180 oil | 85 pts | 85 pts |
| Calcium carbonate (Purecal U) | 40 pts | 40 pts |
| Zinc oxide (Protox 166) | 25 pts | 25 pts |
| Titanium dioxide | 5 pts | 5 pts |
| Magnesium hydroxide | 0.6 pts | 0.6 pts |
| Ambecol 137-X | 5 pts | 5 pts |
| Ultramarine Blue | .062 pts | .062 pts |
| Paraffin wax F3504 | None | 16 pts |

Formulation B contained 15 pts of paraffin wax on about 5 weight percent. The formulations above were prepared employing conventional rubber compounding equipment and the melt rheology and physical properties compared as shown in Table 7.

TABLE 7

PHYSICAL PROPERTIES OF COMPOUNDS WITH AND WITHOUT WAX

| Property | Sample A | Sample B |
|---|---|---|
| Tensile strength, 23° C., psi | 1065 | 910 |
| Elongation, % | 645 | 720 |
| Set at break, % | 44 | 56 |
| Tensile Strength, 60° C., psi | 535 | 455 |
| Elongation, 60° C., % | 575 | 680 |
| Hardness, Shore A | 60 | 56 |
| Melt Index, 43 psi, 190° C. | 4.90 | 6.35 |

It is evident that the presence of small amounts of wax can improve the flow behavior significantly (over 20%) without a substantial deterioration in physical properties. For many injection molding applications this improvement in flow can be extremely important.

EXAMPLE 5

The preparation of sulfonated EPDM was effected as described in Example 1 except that the gum was extended with about 40 parts of Sunpar 180 oil. This oil extended gum was then compounded with other ingredients as follows:

|  | Sample C | Sample D |
|---|---|---|
| Oil extended Sulfo-EPDM | 150 phr | 150 phr |
| Sunpar 180 oil | 70 | 70 |
| Omipalite 90T | 45 | 45 |
| Polyfil XB | 45 | 45 |
| Zinc oxide | 10 | 10 |
| Titanium dioxide | 5 | 5 |
| Amorphous polypropylene[1] | 10 | — |
| Low density polyethylene (LD-610)[2] | 15 | 15 |
| Paraffin wax F-3504 | — | 15 |

[1] A non-crystalline polypropylene of density 0.863 g/cc available commercially
[2] A commercially available low density polyethylene having a melt index of 30 and a density of 0.924 g/cc.

The compounds were prepared in conventional rubber compounding equipment and the resulting homogeneous elastomeric products were compression molded at 300° F. and the physical properties measured as shown in Table 8.

TABLE 8
PHYSICAL AND RHEOLOGICAL PROPERTIES OF COMPOUNDS C AND D

| Property | Sample C | Sample D |
|---|---|---|
| Tensile Strength, 23° C., psi | 505 | 640 |
| Elongation, % | 395 | 450 |
| Set at break, % | 19 | 25 |
| Modulus at 100%, psi | 230 | 275 |
| Cold Tack | Yes | No |
| Shear Stress dynes/cm$^2$ × 10$^{-5}$ | | |
| Shear rate = 0.73 sec$^{-1}$ | .31 | .23 |
| 73 sec$^{-1}$ | 3.4 | 3.2 |
| 728 sec$^{-1}$ | 8.9 | 8.7 |

The data in Table 8 demonstrate the influence of amorphous polypropylene and a paraffinic wax on the physical and rheological properties of a Sulfo-EPDM based compound. There are several surprising and important observations to be made from this comparison. The first one is that the compound containing the paraffinic wax at the low levels employed again improves the flow behavior, (although only slightly) as judged by the lower shear stress at a given shear rate, while simultaneously exhibiting improved physical properties when compared against the compound containing the amorphous polypropylene.

A second observation is that the sample containing the amorphous polypropylene exhibits a tacky surface. This characteristic is often observed in soft compounds based on ionic elastomers at high oil extruder levels. The presence of the low levels of wax shown in this example markedly improve this characteristic such that no significant level of tack is observed.

The experiments above demonstrate that modest levels of wax can improve the flow and physical properties of sulfonated elastomers in important and surprising ways. In addition such waxes have the added benefit of reducing the degree of water sensitivity and tackiness often observed in such systems.

Since many modifications and variations of this invention may be made without departing from the spirit or scope of the invention thereof, it is not intended to limit the spirit or scope thereof to the specific examples thereof.

What is claimed is:

1. An elastomeric blend composition, which consists essentially of:

(a) a neutralized sulfonated elastomeric polymer formed from an elastomeric polymer having from about 0.1 to about 10.0 wt. percent of olefinic unsaturation; said neutralized sulfonated elastomeric polymers having about 15 to about 50 meq. neutralized sulfonate groups per 100 grams of said neutralized sulfonated elastomeric polymer, a counterion of said neutralized sulfonate groups being selected from the group consisting of lead, antimony, ammonium, iron and metals of Groups IA, IIA, IB and IIB of the Periodic Table of Elements and mixtures thereof; and (b) about 2 to about 15 parts by weight of a non-polar wax per 100 parts by weight of said neutralized sulfonated elastomeric polymer, said non-polar wax having an $\overline{M}n$ of less than about 800 and less than about 4 wt. % oxygen.

2. A composition according to claim 1 wherein said neutralized sulfonated elastomeric polymer is formed from an EPDM terpolymer.

3. A composition according to claim 2 wherein said neutralized sulfonated EPDM terpolymer has a viscosity at 200° C. at 0.74 sec$^{-1}$ of about 1×10$^4$ to about 5×10$^6$ poises.

4. A composition according to claim 2 wherein said EPDM terpolymer consists essentially of about 40 to about 80 wt. % of ethylene, of about 10 to about 53 wt. % of propylene and of about 2 to about 10 wt. % of a non-conjugated diene.

5. A composition according to claim 4 wherein said non-conjugated diene is selected from the group consisting of 1,4-hexadiene, dicyclopentadiene, alkenyl substituted norbornenes, alkydidene substituted norbornenes and tetrahydroindenes.

6. A composition according to claim 5 wherein said non-conjugated diene is 5-ethylidene-2-norbornene.

7. A composition according to claim 1, including at least 7 parts by weight of a preferential plasticizer per 100 parts by weight of said neutralized sulfonated elastomeric polymer.

8. A composition according to claim 7 wherein said preferential plasticizer has a melting point of at least 25° C. and is selected from the group consisting of carboxylic acids, metallic salts of said carboxylic acids, amides and amines and mixtures thereof.

9. A composition according to claim 7 wherein said preferential plasticizer is a combination of stearic acid and a metallic salt of said stearic acid, a metal ion of said metallic salt being selected from the group consisting of lead, iron, antimony and Groups IA, IIA, IB and IIB of the Periodic Table of Elements and mixtures thereof.

10. A composition according to claim 8 wherein said metallic salt is selected from the group consisting of zinc stearate, barium stearate, lead stearate, magnesium stearate and sodium stearate.

11. A composition according to claim 1 or 2 wherein said non-polar wax is selected from the group consisting of synthetic, natural and petroleum waxes.

12. A composition according to claim 1 or 2 wherein said polar wax is selected from the group consisting of aromatics, paraffins and naphthenics.

13. An elastomeric blend composition which consists essentially of:

(a) a neutralized sulfonated elastomeric polymer formed from an elastomeric polymer having from about 0.1 to about 10.0 wt. percent of olefinic unsaturation; said neutralized sulfonated elastomeric polymers having about 15 to about 50 meq. neutralized sulfonate groups per 100 grams of said neutralized sulfonated elastomeric polymer, a counterion of said neutralized sulfonate groups being selected from the group consisting of lead, antimony, ammonium, iron and metals of Groups IA, IIA, IB and IIB of the Periodic Table of Elements and mixtures thereof;

(b) about 2 to about 15 parts by weight of a non-polar wax per 100 parts by weight of said neutralized sulfonated elastomeric polymer, said non-polar wax having an Mn of less than about 800 and less than about 4 wt. % oxygen; and (c) at least about 7 parts by weight of a preferential plasticizer per 100 parts by weight of the neutralized sulfonated elastomeric polymer.

14. A composition according to claim 13 wherein said preferential plasticizer is a combination of a carboxylic acid having about 5 to about 30 carbon atoms and a metallic salt of said carboxylic acid.

15. A composition according to claim 13 wherein said neutralized sulfonated elastomeric polymer is formed from an EPDM terpolymer.

16. A composition according to claim 15 wherein said elastomeric polymer has an $\overline{M}n$ of less than about 60,000 and a Mooney viscosity (ML, 1+8, 212° F.) of about 5 to about 60.

17. A composition according to claim 13 wherein said EPDM terpolymer consists essentially of about 40 to about 80 wt. % of ethylene, of about 10 to about 53 wt. % of propylene and of about 2 to about 10 wt. % of a non-conjugated diene.

18. An elastomeric blend composition which consists essentially of:

(a) a neutralized sulfonated elastomeric polymer formed from an elastomeric polymer having from about 0.1 to about 10.0 wt. percent of olefinic unsaturation; said neutralized sulfonated elastomeric polymers having about 15 to about 50 meq. neutralized sulfonate groups per 100 grams of said neutralized sulfonated elastomeric polymer, a counterion of said neutralized sulfonate groups being selected from the group consisting of lead, antimony, ammonium, iron and Groups IA, IIA, IB and IIB of the Periodic Table of Elements and mixtures thereof; and (b) about 2 to about 15 parts by weight of a non-polar wax per 100 parts by weight of said neutralized sulfonated elastomeric polymer, said non-polar wax having an Mn of less than about 800 and less than about 4 wt. % oxygen;

(c) at least about 7 parts by weight of a preferential plasticizer per 100 parts by weight of the neutralized sulfonated elastomeric polymer;

(d) about 50 to about 300 parts by weight of a filler per 100 parts by weight of said neutralized sulfonated elastomeric polymer, said filler being selected from the group consisting of aluminum silicate, talc, calcium silicate, calcium carbonate and magnesium silicate and mixtures thereof; and (e) less than about 100 parts by weight of a non-polar process oil per 100 parts by weight of said neutralized sulfonated elastomer.

19. A composition according to claim 18 wherein said preferential plasticizer is a combination of a carboxylic acid having about 5 to about 30 carbon atoms and a metallic salt of said carboxylic acid.

20. A composition according to claim 18 wherein said neutralized sulfonated elastomeric polymer is formed from an EPDM terpolymer.

21. A composition according to claim 20 wherein said elastomeric polymer has an Mn of less than about 60,000 and a Mooney viscosity of 212° F. of about 5 to about 60.

22. A composition according to claim 18 wherein said EPDM terpolymer consists essentially of about 40 to about 80 wt. % of ethylene, of about 10 to about 53 wt. % of propylene and of about 2 to about 10 wt. % of a non-conjugated diene.

23. An elastomeric blend composition which consists essentially of:

(a) a neutralized sulfonated elastomeric polymer formed from an elastomeric polymer having from about 0.1 to about 10.0 wt. percent of olefinic unsaturation; said neutralized sulfonated elastomeric polymers having about 15 to about 50 meq. neutralized sulfonate groups per 100 grams of said neutralized sulfonated elastomeric polymer, a counterion of said neutralized sulfonate groups being selected from the group consisting of lead, anitmony, ammonium, iron and Groups IA, IIA, IB and IIB of the Periodic Table of Elements and mixtures thereof; and (b) about 2 to about 15 parts by weight of a non-polar wax per 100 parts by weight of said neutralized sulfonated elastomeric polymer, said non-polar wax having an Mn of less than about 800 and less than about 4 wt. % oxygen;

(c) about 50 to about 300 parts by weight of a filler per 100 parts by weight of said neutralized sulfonated elastomeric polymer, said filler being selected from the group consisting of aluminum silicate, talc, calcium silicate, calcium carbonate and magnesium silicate and mixtures thereof; and (d) less than about 100 parts by weight of a non-polar process oil per 100 parts by weight of said neutralized sulfonated elastomer.

24. A composition according to claim 23 wherein said neutralized sulfonated elastomeric polymer is formed from an EPDM terpolymer.

25. A composition according to claim 15 wherein said elastomeric polymer has an Mn of less than about 60,000 and a Mooney viscosity (212° F.,ML 1+8) of about 5 to about 60.

26. An elastomer article formed from an elastomeric blend composition which consists essentially of:

(a) a neutralized sulfonated elastomeric polymer formed from an elastomeric polymer having from about 0.1 to about 10.0 wt. percent of olefinic unsaturation; said neutralized sulfonated elastomeric polymers having about 15 to about 50 meq. sulfonate groups per 100 grams of said neutralized sulfonated elastomeric polymer, a counterion of said metal sulfonate groups being selected from the group consisting of lead, ammonium, antimony, iron, and Groups IA, IIA, IB and IIB of the Periodic Table of Elements and mixtures thereof; and (b) about 2 to about 15 parts by weight of a non-polar wax per 100 parts of said neutralized sulfonated elastomeric polymer, said non-polar wax having an Mn of less than about 800 and less than about 4 wt. % oxygen.

27. An elastomeric articles according to claim 26 wherein said neutralized sulfonated elastomeric polymer is derived from an EPDM terpolymer.

28. An elastomeric article formed from an elastomeric blend composition consisting essentially of:
(a) a neutralized sulfonated elastomeric polymer formed from an elastomeric polymer having from about 0.1 to about 10.0 wt. percent of olefinic unsaturation; said neutralized sulfonated elastomeric polymers having about 15 to about 50 meq. neutralized sulfonate groups per 100 grams of said neutralized sulfonated elastomeric polymer, a counterion of said neutralized sulfonate groups being selected from the group consisting of lead, ammonium, antimony, iron and metals of Groups IA, IIA, IB and IIB of the Periodic Table of Elements and mixtures thereof;
(b) about 2 to about 15 parts by weight of a non-polar wax per 100 parts by weight of said neutralized sulfonated elastomeric polymer, said non-polar wax having an Mn of less than about 800 and less than about 4 wt. % oxygen; and
(c) at least about 7 parts by weight of a preferential plasticizer per 100 parts by weight of the neutralized sulfonated elastomeric polymer.

29. An elastomeric article according to claim 28 wherein said neutralized sulfonated elastomeric polymer is derived from an EPDM terpolymer.

30. An elastomeric article according to claim 28 wherein said preferential plasticizer is a combination of a carboxylic acid and having about 5 to about 30 carbon atoms and a metallic salt of said carboxylic acid.

31. An elastomeric article formed from an elastomeric blend composition consisting essentially of:
(a) a neutralized sulfonated elastomeric polymer formed from an elastomeric polymer having from about 0.1 to about 10.0 wt. percent of olefinic unsaturation; said neutralized sulfonated elastomeric polymers having about 15 to about 50 meq. neutralized sulfonate groups per 100 grams of said neutralized sulfonated elastomeric polymer, a counterion of said neutralized sulfonate groups being selected from the group consisting of lead, ammonium, antimony, iron and Groups IA, IIA, IB and IIB of the Periodic Table of Elements and mixtures thereof;
(b) about 2 to about 15 parts by weight of a non-polar wax per 100 parts by weight of said neutralized sulfonated elastomeric polymer, said non-polar wax having an Mn of less than about 800 and less than about 4 wt. % oxygen;
(c) at least about 7 parts by weight of a preferential plasticizer per 100 parts by weight of the neutralized sulfonated elastomeric polymer;
(d) about 50 to about 300 parts by weight of a filler per 100 parts by weight of said neutralized sulfonated elastomeric polymer, said filler being selected from the group consisting of aluminum silicate, talc, calcium silicate, calcium carbonate, and magnesium silicate and mixtures thereof; and
(e) less than about 100 parts by weight of a non-polar process oil per 100 parts by weight of said neutralized sulfonated elastomer.

32. An elastomeric article according to claim 31 wherein said neutralized sulfonated elastomeric polymer is derived from an EPDM terpolymer.

33. An elastomeric article according to claim 31 wherein said preferential plasticizer is a combination of a carboxylic and having about 5 to about 30 carbon atoms and a metallic salt of said carboxylic acid.

34. An elastomeric article formed from an elastomeric blend composition consisting essentially of:
(a) a neutralized sulfonated elastomeric polymer formed from an elastomeric polymer having from about 0.1 to about 10.0 wt. percent of olefinic unsaturation; said neutralized sulfonated elastomeric polymers having about 15 to about 50 meq. neutralized sulfonate groups per 100 grams of said neutralized sulfonated elastomeric polymer, a counterion of said neutralized sulfonate groups being selected from the group consisting of lead, aluminum, antimony, iron and metals of Groups IA, IIA, IB and IIB of the Periodic Table of Elements and mixtures thereof;
(b) about 2 to about 15 parts by weight of a non-polar wax per 100 parts by weight of said neutralized sulfonated elastomeric polymer, said non-polar wax having an Mn of less than about 800 and less than about 4 wt. % oxygen;
(c) about 50 to about 300 parts by weight of a filler per 100 parts by weight of said neutralized sulfonated elastomeric polymer, said filler being selected from the group consisting of aluminum silicate, talc, calcium silicate, calcium carbonate, or magnesium silicate and mixtures thereof; and
(d) less than about 100 parts by weight of a non-polar process oil per 100 parts by weight of said neutralized sulfonated elastomer.

35. An elastomeric article according to claim 34 wherein said neutralized sulfonated elastomeric polymer is derived from an EPDM terpolymer.

* * * * *